(12) United States Patent
Kawashima

(10) Patent No.: US 6,330,040 B1
(45) Date of Patent: Dec. 11, 2001

(54) APPARATUS AND METHOD FOR CALIBRATING VIDEO DISPLAYS

(75) Inventor: Toshiyuki Kawashima, N. Hundingdon, PA (US)

(73) Assignees: Sony Corporation, Tokyo (JP); Sony Electronic, Inc., Park Ridge, NJ (US)

( * ) Notice: Subject to any disclaimer, the term of this patent is extended or adjusted under 35 U.S.C. 154(b) by 0 days.

(21) Appl. No.: 09/015,382

(22) Filed: Jan. 29, 1998

(51) Int. Cl.[7] .................................. H04N 5/64; H04N 9/31
(52) U.S. Cl. ........................... 348/744; 348/745; 348/181; 348/189; 348/806; 348/807; 348/835
(58) Field of Search .................................... 348/744, 745, 348/758, 760, 778, 181, 189, 805–809, 835; H04N 5/64, 9/31

(56) References Cited

U.S. PATENT DOCUMENTS

| | | | |
|---|---|---|---|
| 5,333,010 | * | 7/1994 | Nakamura et al. ................. 348/263 |
| 5,798,790 | * | 8/1998 | Knox et al. ......................... 348/184 |
| 5,883,476 | * | 3/1999 | Noguchi et al. .................... 348/745 |
| 5,939,843 | * | 8/1999 | Kimoto et al. ...................... 348/745 |
| 6,018,361 | * | 1/2000 | Fuhii et al. ......................... 348/180 |
| 6,034,742 | * | 3/2000 | Kimote et al. ...................... 348/625 |
| 6,057,881 | * | 5/2000 | Kawashima et al. ............... 348/190 |
| 6,100,926 | * | 8/2000 | Kawashima ........................ 348/181 |

* cited by examiner

Primary Examiner—Michael Lee
Assistant Examiner—Linus H. Lo
(74) Attorney, Agent, or Firm—Frommer Lawrence & Haug LLP; William S. Frommer; Bruno Polito

(57) ABSTRACT

A television system performs beam convergence in video displays. The system is implemented through one or more convergence sensors, which are exposed to two distinct convergence test patterns. The output signals from the sensors when exposed to the two test patterns are used in beam convergence calculations. The test patterns are selected to reduce the dynamic range requirement for an A/D converter in the television system supplied with the sensor output signals. A low-pass filter circuit with selectable characteristics is also used to reduce the dynamic range requirement.

17 Claims, 13 Drawing Sheets

NO PATTERN

NO PATTERN

DECAY CHARACTERISTIC OF EACH PHOSPHOR

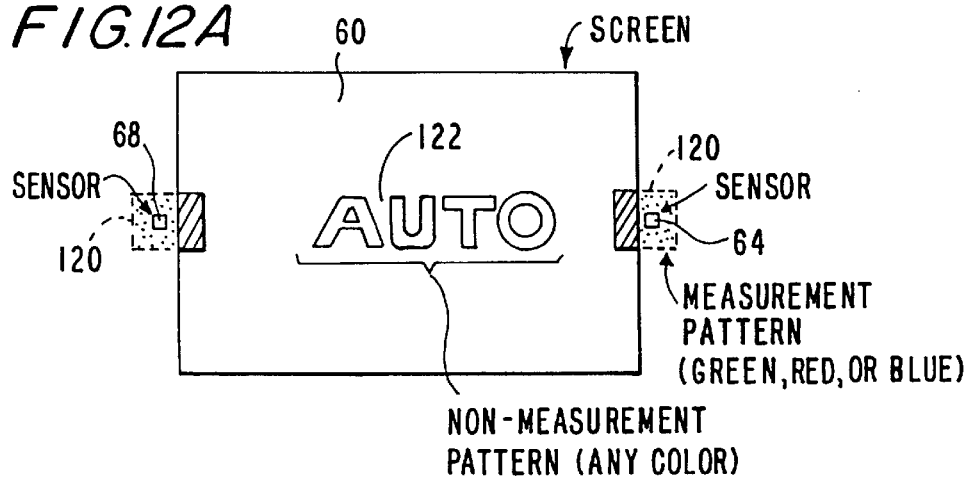
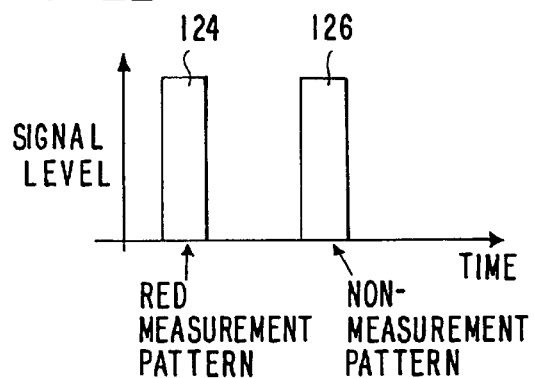
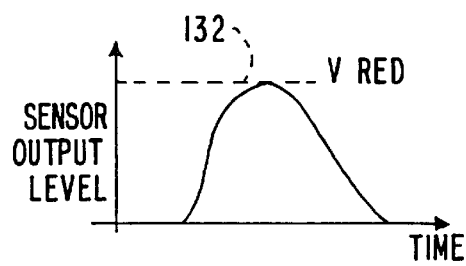
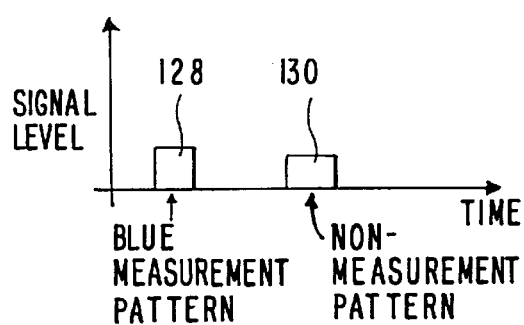
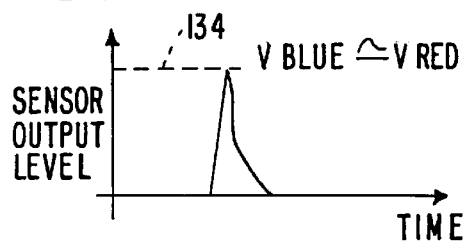

$R_1 C_1 \neq R_2 C_2$
$R_2 C_2 \neq R_3 C_3$
$R_3 C_3 \neq R_1 C_1$

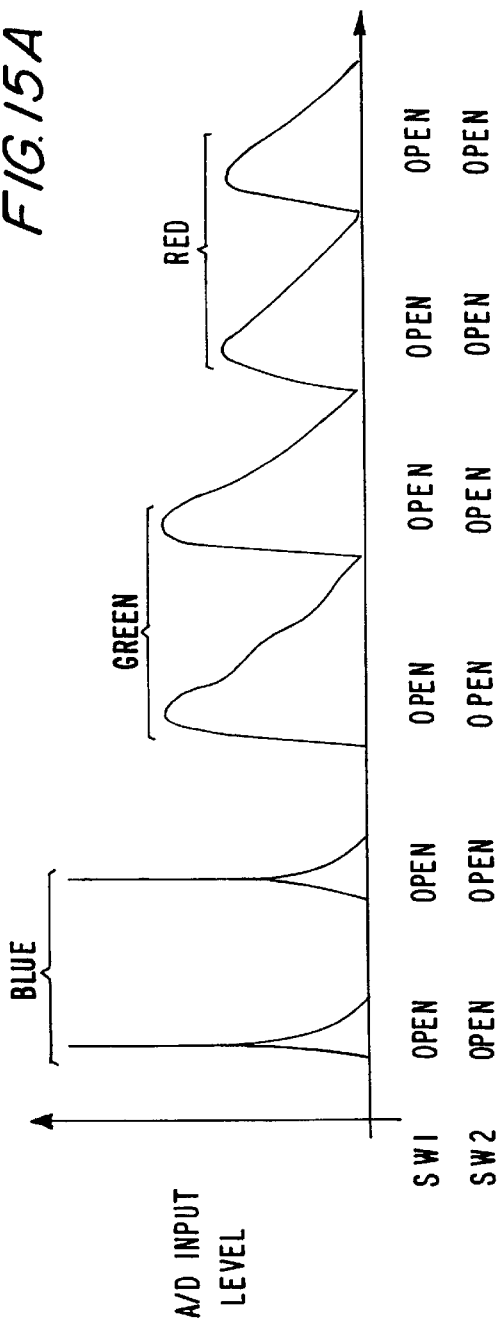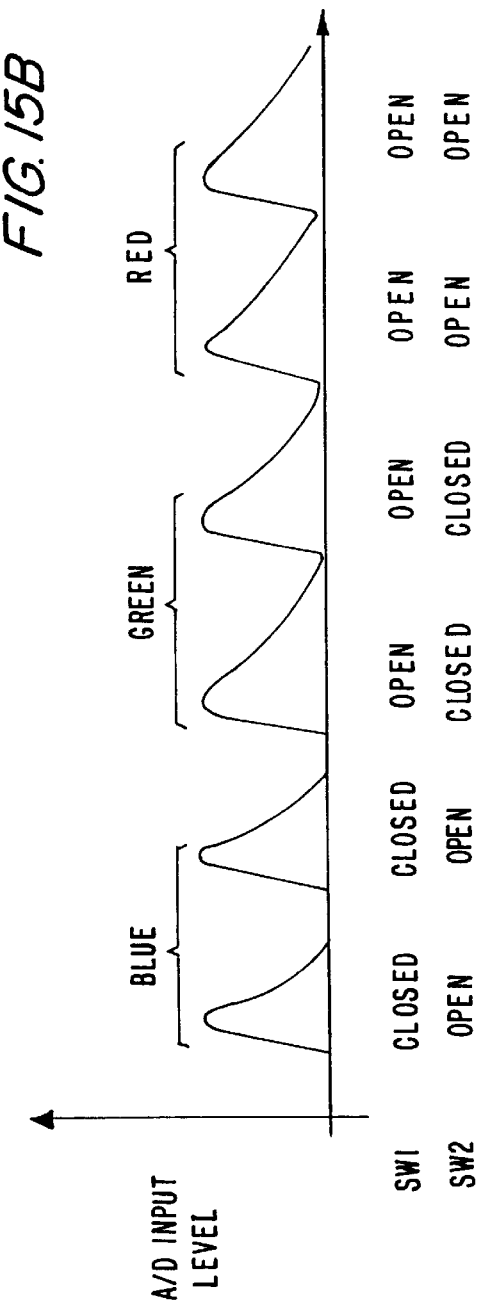

APPARATUS AND METHOD FOR CALIBRATING VIDEO DISPLAYS

BACKGROUND OF THE INVENTION

The present invention is related to video displays, and more particularly to performing convergence calibration in video displays.

It is well known in the field of video displays to generate pictures on a screen by combining multiple beams of light. For example, a typical rear projection color television set includes three cathode ray tubes (CRTs), each CRT processing one of the primary colors—red, blue or green. By combining the three monochromatic beams the set can produce full color television pictures. However, in order for the set to produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

FIGS. 4B and 4C show test patterns that are generated when the red CRT is properly aligned with the center of the screen. FIG. 4B shows a red-wide pattern 40 and its relative position to the scannable area, screen, and sensors. As can be seen from the figure, the red-wide pattern is made up of four illuminated areas that define a rectangle (indicated by the dotted line). Each illuminated area overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern 42. As in the case of the wide pattern, since the CRT is properly aligned, the x and o coincide. However, in the case of the narrow pattern, only one half of each of the sensors are overlapped by the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

FIG. 4D shows a red-wide pattern 44 that is generated when the red CRT is misaligned by an amount $\delta$ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount $\delta$ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrow-pattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/$\delta$-misalignment conditions (FIG. 5D) to generate a first difference; the sensor reading under no pattern conditions is subtracted from the sensor reading under narrow-pattern/$\delta$-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

It has been recognized that in order to achieve precise convergence the ratio calculation must be performed with a high degree of accuracy. For this purpose the calculations are typically performed digitally. However, to perform the calculations digitally the sensor readings must first be passed through an A/D converter, which introduces quantization noise into the sensor measurements and thereby degrades the convergence precision. To minimize the quantization noise introduced by the A/D converter, a high resolution A/D converter is required.

It has been further recognized that the complexity and cost of high resolution A/D converters increases with the dynamic range required of the converters. Thus, by decreasing the A/D converter dynamic range required by the convergence procedure, a less expensive A/D converter may be used without sacrificing convergence accuracy. That is, by relaxing the convergence system's dynamic range requirement, the designer may trade off some A/D dynamic range for increased A/D resolution, while keeping the price of the A/D converter constant and maintaining the accuracy of convergence calculations.

OBJECTS OF THE INVENTION

It is an object of the present invention to provide convergence calibration/adjustment in video displays.

It is another object of the present invention to provide convergence calibration/adjustment that can reduce the dynamic range in A/D converters in video displays.

It is a further object of the present invention to provide convergence calibration/adjustment wherein the input signals to A/D converters in video displays are kept near the maximum levels for such converters.

It is a further object of the present invention to provide convergence calibration/adjustment without supplying either a saturation signal level or insufficient signal level to A/D converters in video displays such that the accuracy of calibration/adjustment is enhanced.

SUMMARY OF THE INVENTION

These and other objects, features and advantages are accomplished by an apparatus and method for performing convergence calibration in a video system using multiple light beams to generate a video display on a screen. The apparatus includes cathode ray tubes producing light beams of different colors, a photosensor responsive to the light beams, a low-pass filter circuit having first filter characteristics and second filter characteristics, and a controller. The low-pass filter circuit is connected to receive signals derived from the output of the photosensor and is controlled to alter the filter characteristics depending upon the type of light beam incident on the photosensor.

The low-pass filter circuit may include at least one resistor, at least two capacitors, and a switch for disconnecting one of the capacitors. Alternatively, the low-pass filter circuit may include at least one capacitor, at least two resistors, and a switch for disconnecting one of the resistors. Another embodiment of the invention includes a low-pass filter circuit with a first resistance-capacitance low-pass filter, a second resistance-capacitance low-pass filter, and a switch capable of connecting either the first resistance-capacitance filter or the second resistance-capacitance filter to the signals derived from the photosensor.

BRIEF DESCRIPTION OF THE DRAWINGS

The above-mentioned as well as additional objects, features and advantages of the present invention will become readily apparent from the following detailed description thereof, which is to be read in conjunction with the accompanying drawings, in which:

FIG. 12A shows a measurement pattern along with a picture or non-measurement pattern;

FIGS. 12B–12E show representative sensor input and output signal levels as functions of time;

FIGS. 15A and 15B show the effect of the circuit of FIG. 13 on signal levels.

In all Figures, like reference numerals represent the same or identical components.

DETAILED DESCRIPTION OF THE PREFERRED EMBODIMENTS

FIGS. 6A–6D show illustrative beam convergence test patterns generated according to a preferred embodiment of the invention. Although the test patterns depicted in the figures may be generated by any one of the CRTs, they will be discussed in the context of the red CRT for clarity of presentation.

Figure 6A:
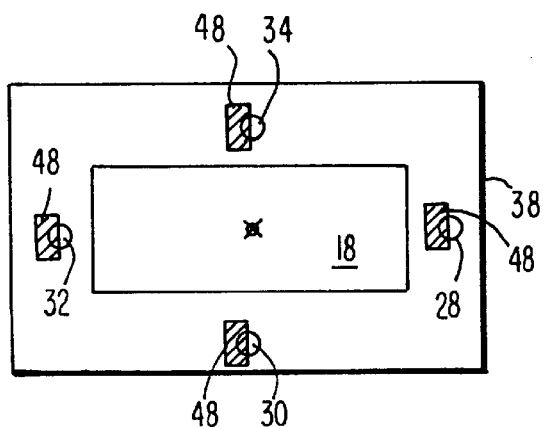
FIGS. 6A–6D show the relationship between the sensors, the display screen, the scannable area, and several test patterns.
Figure 6B:
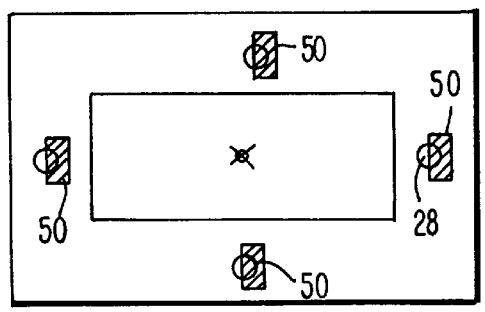

FIGS. 6A and 6B show the test patterns generated by the red CRT when it is properly aligned. FIG. 6A shows a first test pattern 48 which overlaps a left side portion (from the viewer's perspective) of each sensor. FIG. 6B shows a second test pattern 50 which overlaps a right side portion of each sensor. As was the case in FIGS. 4A–4E, "o" indicates the center of the screen and "x" indicates the center of the rectangle defined by the test patterns. The "o" and "x" coincide in FIGS. 6A and 6B since these figures represent the case of proper beam alignment.

Figure 6C:
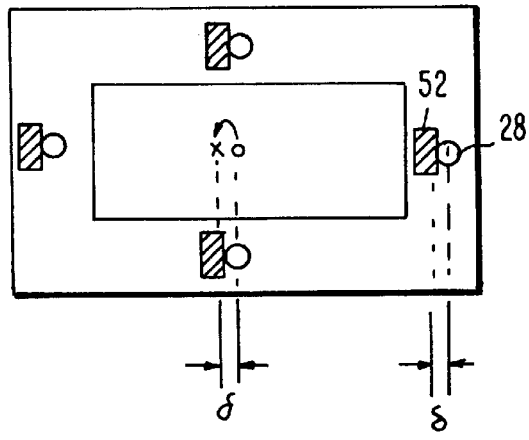
Figure 6D:
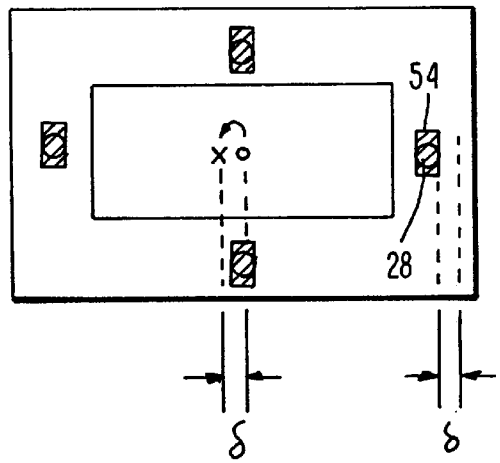

FIGS. 6C and 6D show a shifted first test pattern 52 and a shifted second test pattern 54, respectively. The shifted first pattern is the pattern that results when the CRT is misaligned and attempts to generate the first pattern. The shifted second pattern is the pattern that results when the CRT is misaligned and attempts to generate the second pattern. In both of FIGS. 6C and 6D, the CRT is misaligned by an amount δ in the horizontal direction (left of center from the viewer's perspective).

As can be seen from FIGS. 6A–6D, the effect of the misalignment on the first pattern is to shift the pattern (FIG. 6C) so that its overlap with sensor 28 is significantly less than it was in the no-misalignment case (FIG. 6A). Whereas the effect of the misalignment on the second pattern is to shift the pattern (FIG. 6D) so that its overlap with sensor 28 is significantly greater than it was in the no-misalignment case (FIG. 6B). As will be described below, the overlap changes for the two test patterns that occur as a result of misalignment are used to determine the amount of misalignment. The amount of misalignment is then, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no-misalignment conditions. The difference between the measured ratio and the desired ratio indicates the amount of beam misalignment at the sensor's location. What follows is a description of an illustrative misalignment determination as performed on the basis of readings taken through sensor 28.

Figure 7A:
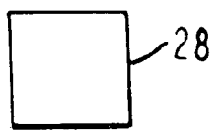
FIG. 7A is a representation of an unilluminated sensor.

FIGS. 7A–7E show the relationship between sensor 28 and various test patterns. FIG. 7A depicts the sensor in a no pattern condition. FIGS. 7B–7E show the sensor as illuminated by the patterns of FIGS. 6A–6D, respectively. To measure the misalignment, the light incident on sensor 28 is measured for each of the first pattern and second pattern; and these measurements are used to form a ratio. The value of the ratio in the no-misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 7B) to generate a first difference; the sensor reading under no pattern conditions is subtracted from the sensor reading under second-pattern/no-misalignment conditions (FIG. 7C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 7D) to generate a first difference; the sensor reading under no pattern conditions is subtracted from the sensor reading under second-pattern/δ-misalignment conditions (FIG. 7E) to generate a second difference; the first difference is added to the second difference to form a sum; and the first difference is divided by the sum. The difference between the two ratios thus obtained indicates the amount of misalignment. The red CRT is then adjusted until the ratios match. A similar procedure is executed for the other primary beams and in this manner convergence about sensor 28 is achieved. Finally, similar procedures may then be executed about the other sensors to complete an overall convergence procedure.

By using the test patterns described above, the dynamic range required of the sensor A/D converters is reduced, thereby allowing convergence procedures to be performed through more cost efficient hardware. To illustrate how the dynamic range requirement is reduced reference is made to FIGS. 5A–5E and 7A–7E.

Figure 1:
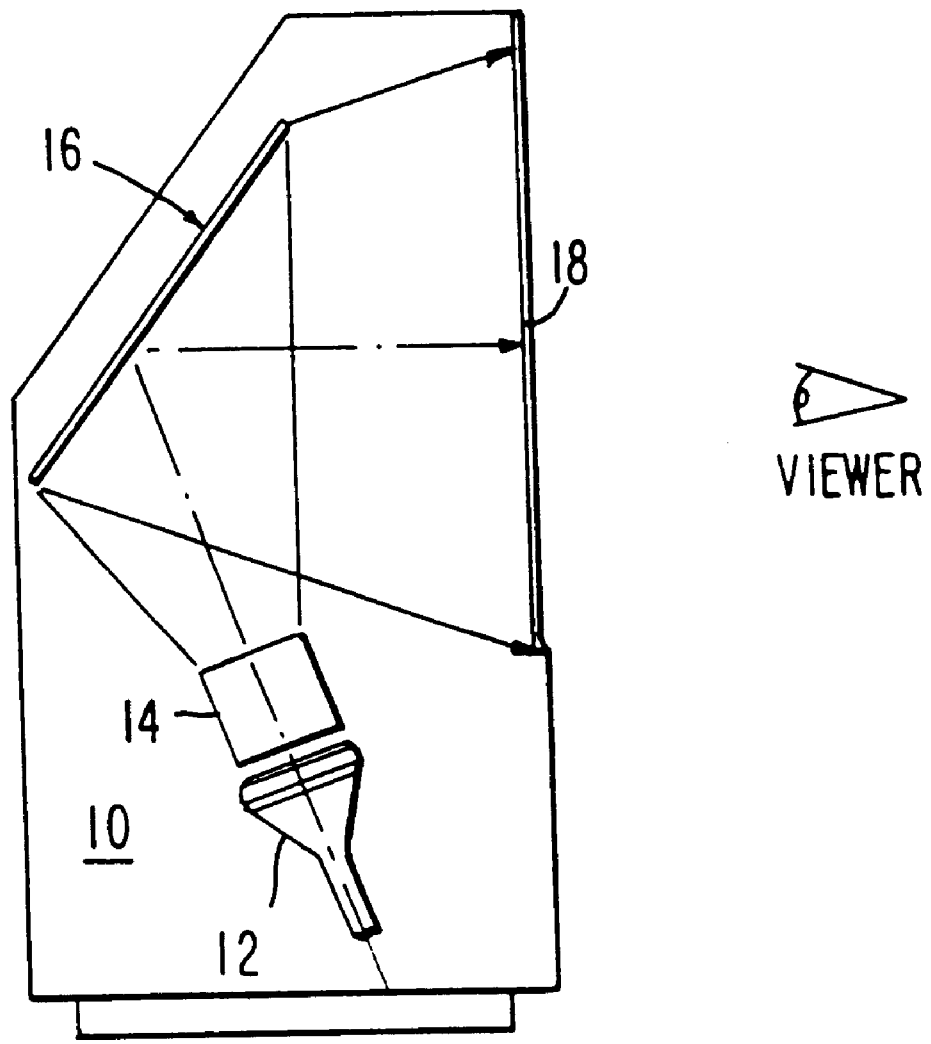
FIG. 1 is a plan view of a typical rear projection television set.
Figure 2:
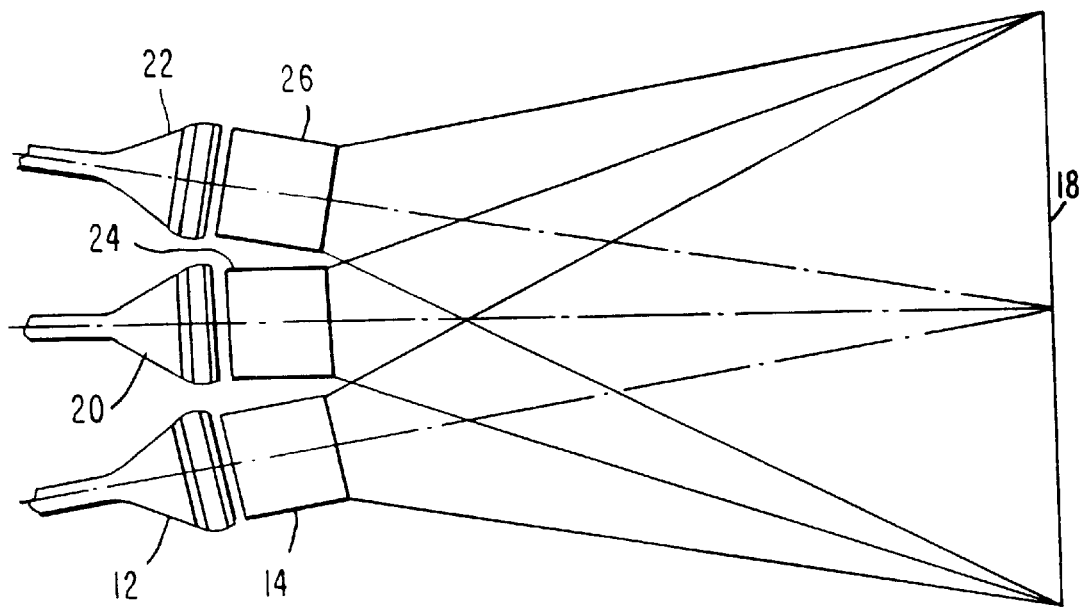
FIG. 2 illustrates the relationship between the three CRTs of the FIG. 1 set.
Figure 3:
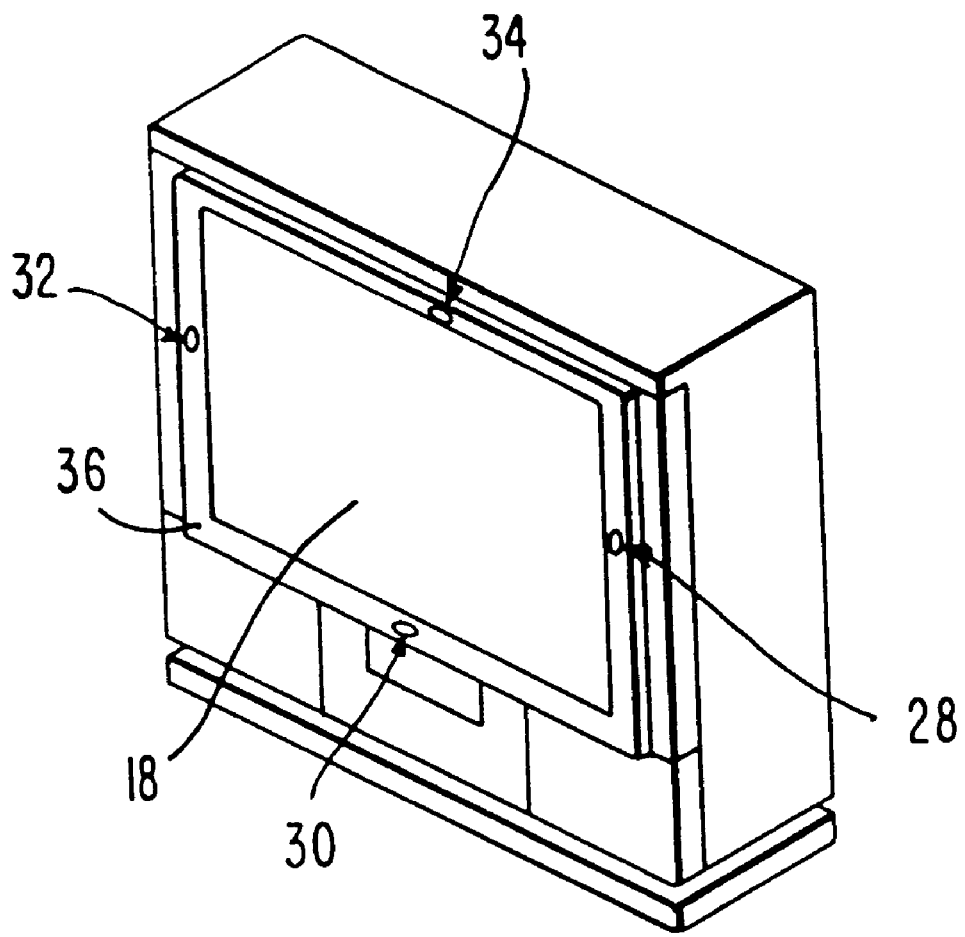
FIG. 3 shows how photosensors are typically arranged around a screen for purposes of maintaining beam convergence.
Figure 4A:
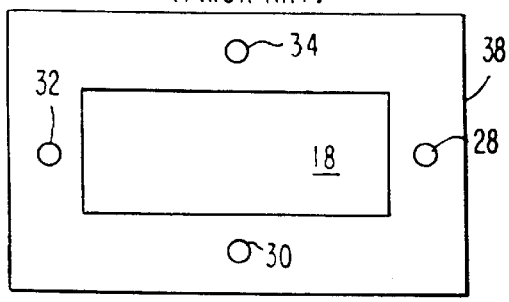
FIG. 4A shows the typical relationship between a plurality of convergence sensors, a display screen, and a CRT scannable area.
Figure 4B:
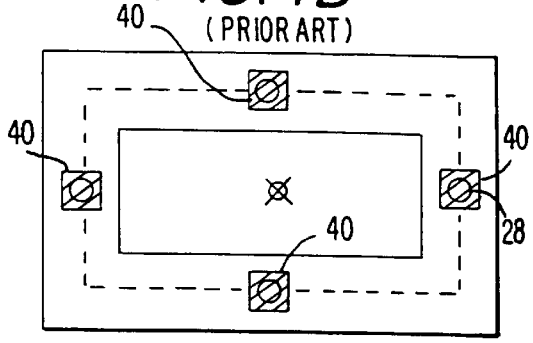
FIGS. 4B–4E show the typical relationship between the sensors, the display screen, the scannable area, and several test patterns.
Figure 4C:
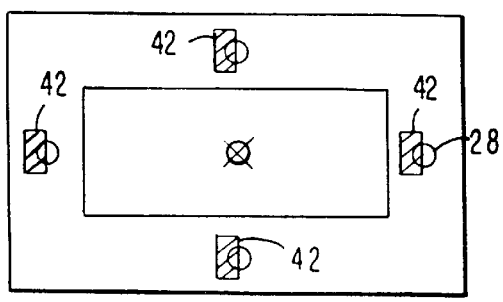
Figure 4D:
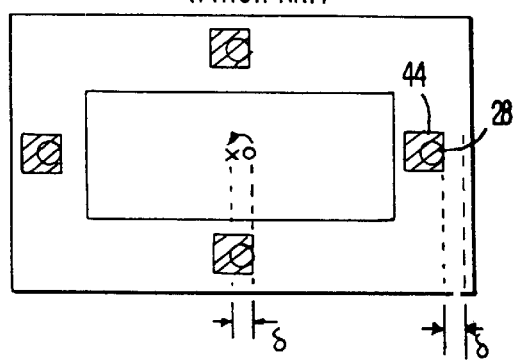
Figure 4E:
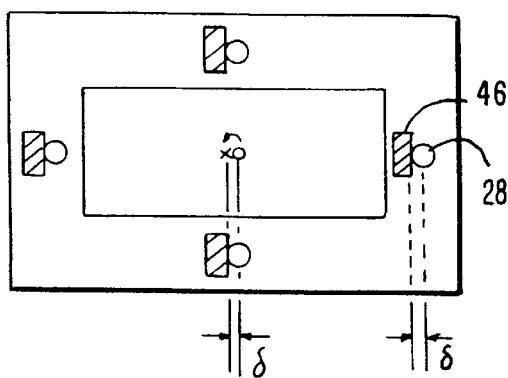
Figure 5A:
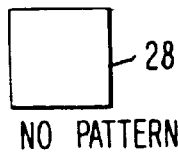
FIG. 5A is a representation of an unilluminated sensor.
Figure 5B:
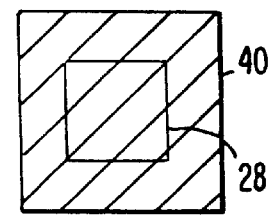
FIGS. 5B–5E are representations of the sensor of FIG. 5A as illuminated by the test patterns of FIGS. 4B–4E, respectively.
Figure 5C:
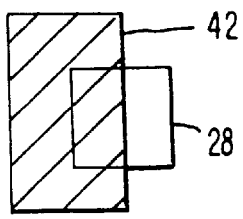
Figure 5D:
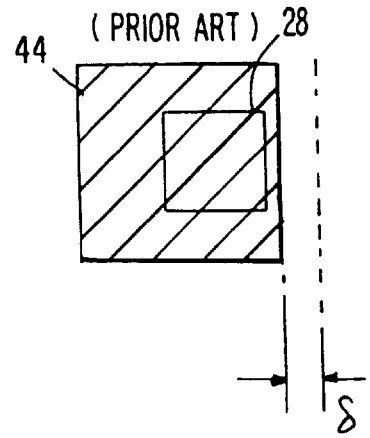
Figure 5E:
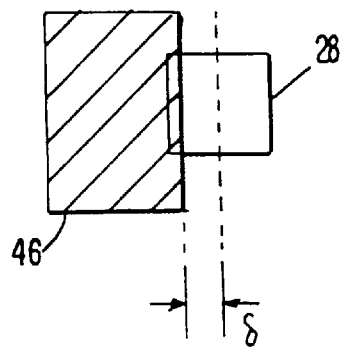

As mentioned above, A/D converters are employed to convert the output of convergence sensors from analog signals to digital signals. In prior systems, the analog sensor signals that had to be converted by the A/D converters ranged from the signal generated when the sensor was fully illuminated to the signal generated when the sensor was not illuminated at all. For example, in prior systems, the signal obtained from the unilluminated sensor in FIG. 5A and the signal from the fully illuminated sensor in FIG. 5D are both converted to digital signals so that they can be used to calculate the convergence ratio. However, a sensor A/D converter does not have to convert the signal from a fully illuminated sensor.

The first and second test patterns are preferably chosen such that for any given sensor the areas of the sensor overlapped by the first and second patterns are complimentary. That is, the area not overlapped by the first pattern is equal to the area overlapped by the second pattern; and the area not overlapped by the second pattern is equal to the area overlapped by the first pattern. Thus, a value for a fully illuminated sensor may be obtained by adding the digitally converted output generated during illumination by the first pattern to the digitally converted output generated during illumination by the second pattern, without actually fully illuminating the sensor. Indeed, as will be explained with references to FIGS. 7B–7E, the maximum sensor illumination is close to 50%.

Figure 7B:
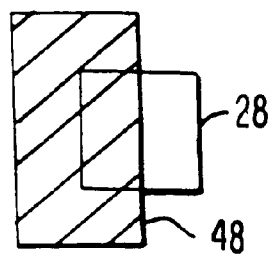
FIGS. 7B–7E are representations of the sensor of FIG. 7A as illuminated by the test patterns of FIGS. 6A–6D, respectively.
Figure 7C:
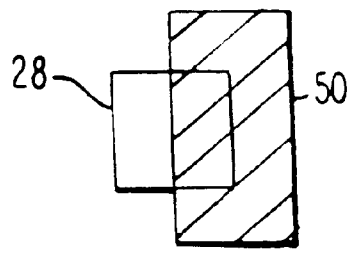
Figure 7D:
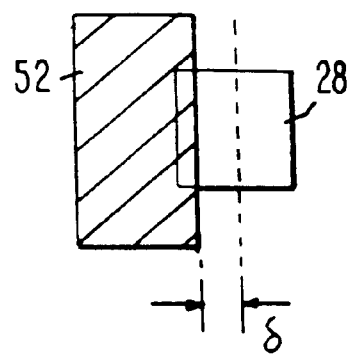
Figure 7E:
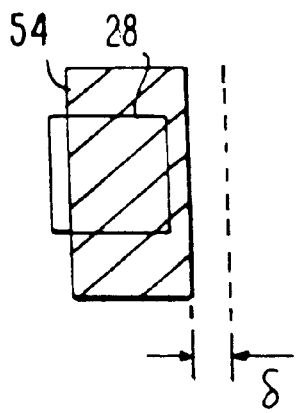

Regarding sensor illumination in the no-misalignment case, it can be seen from FIGS. 7B and 7C that the maximum signal that must be converted in the no-misalignment case is the signal corresponding to approximately 50% illumination. Regarding sensor illumination in the δ-misalignment case, it can be seen from FIG. 7E that the maximum signal that must be converted is somewhat more than the signal corresponding to approximately 50% illumination. However, the amount of misalignment δ is typically small compared to the size of the sensor, and therefore the magnitude of the signal will not be significantly larger than the signal corresponding to 50% sensor illumination. Thus, the reduction in A/D dynamic range requirement is on the order of 50%.

Figure 8:
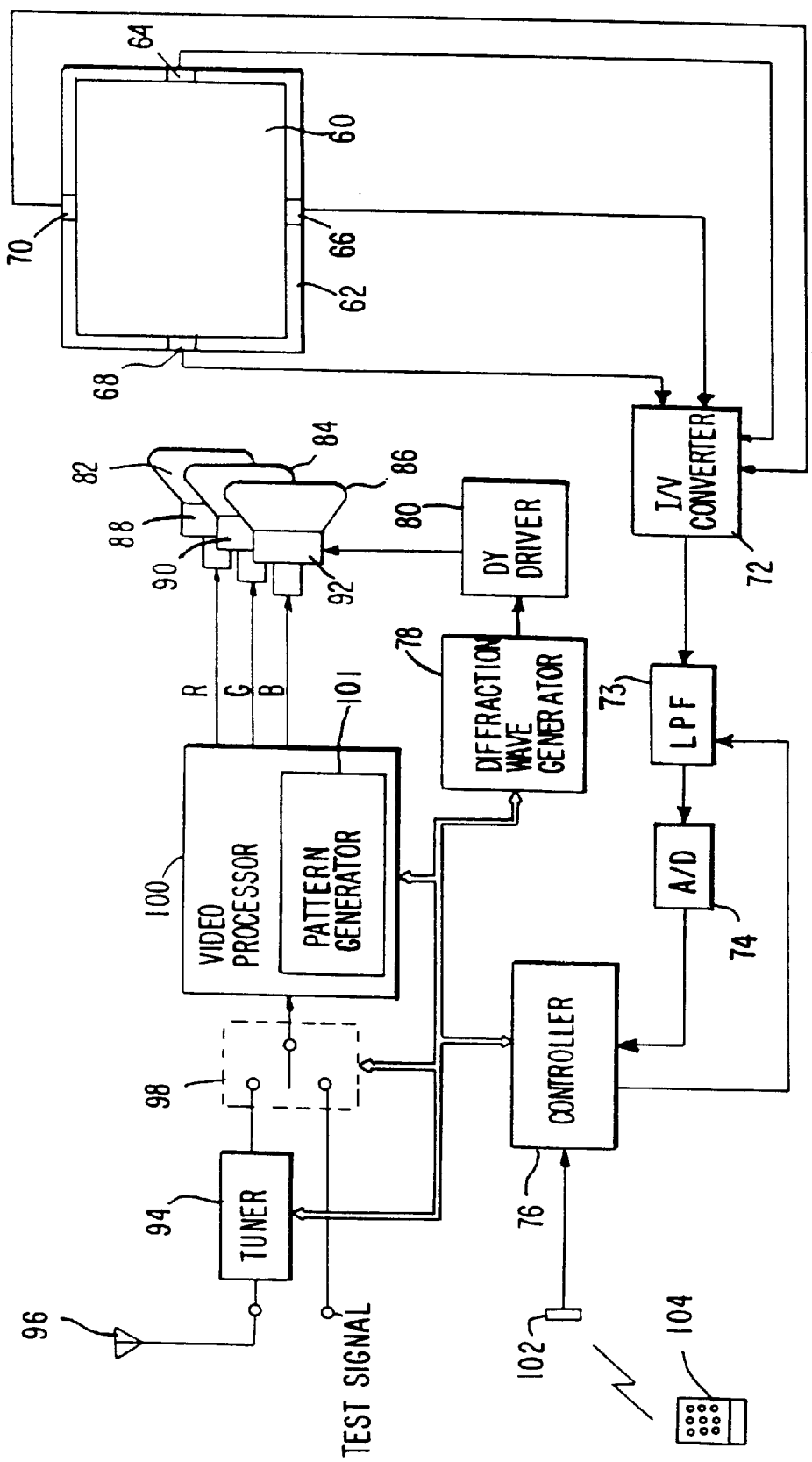
FIG. 8 is a schematic diagram of a television system according to the present invention.

A schematic diagram of a television system according to the invention is shown in FIG. 8. The system includes a television screen 60 and three CRTs 82, 84 and 86 for forming images on the screen. Each CRT emits a beam of monochromatic light in one of the primary colors (red, blue and green), and each includes a deflection yoke, 88, 90 and 92, respectively. Control of the CRTs 82, 84, 86 for the purpose of forming images on the screen is performed by a video processor 100. Accordingly, the video processor 100 (such as a programmable controller) includes a pattern generator 101 for forming the convergence test patterns. Convergence adjustment of the CRTs 82, 84, 86 is performed through a deflection yoke driver 80. Since the invention concerns convergence operations, the convergence portion of the system will be emphasized.

The system includes four convergence photosensors 64, 66, 68 and 70. These sensors are located at the periphery of the screen, behind a screen frame 62. During convergence operations, the sensors 64, 66, 68, 70 generate analog current signals which are passed to a current-to-voltage (I/V) converter 72. The current-to-voltage converter 72 converts the current signals to analog voltage signals. The analog voltage signals are supplied to a low-pass filter circuit 73, which will be discussed in greater detail below. The signals from the low-pass filter 73 are sent to an A/D converter 74. The A/D converter 74 receives the filtered analog voltage signals, converts them to digital voltage signals, and passes the digital voltage signals to a controller 76. The controller 76 then uses the digital voltage signals to perform the convergence calculations and determine the amount of any necessary beam alignment corrections. If correction is required, the controller 76 sends appropriate correction signals to a diffraction wave generator 78. The correction signals received by the diffraction wave generator 78 are converted into driver signals which are, in turn, passed to the deflection yoke driver 80. The deflection yoke driver 80 then generates one or more deflection yoke control signals and applies them to the CRT deflection yokes 88, 90 and 92. Through repeated beam adjustment by way of the deflection yokes 88, 90 and 92, proper beam alignment is maintained.

In addition to the above-identified elements, the television system of FIG. 8 includes a tuner 94, an antenna 96, a switch 98, and an infrared receiver 102. The tuner 94 is used for receiving television signals, such as broadcast signals, through the antenna 96. These signals are coupled to the video processor 100 by switch 98. However, the switch 98 may deselect the tuner 94 in favor of a test signal for purposes of testing the system. Infrared receiver 102 is provided to allow for remote control of the system via remote control unit 104.

In a television system using the inventive calibration/adjustment circuits as described hereinabove and shown in FIG. 8, it is important to set at a proper level the analog signal (voltage) supplied to the A/D converter 74. That is, if the input signal level from the current-to-voltage converter 72 is too high, the A/D converter 74 will become saturated and, among other things, the operation of the calibration/adjustment procedure will be erroneous because the positions of the beams will not be calculated accurately. On the other hand, if the input signal level from the current-to-voltage converter 72 is too low, the conversion by the A/D converter 74 also will be imprecise. Namely, because of the low input signal level which may be additionally influenced by a noise signal level, the resolution of the A/D converter 74 will be so low that the conversion accuracy will be significantly affected. For this reason, the signal output by the current-to-voltage converter 72 should be kept at an optimum level, and preferably just below the maximum (saturation) level of the A/D converter 74.

Figure 9A:
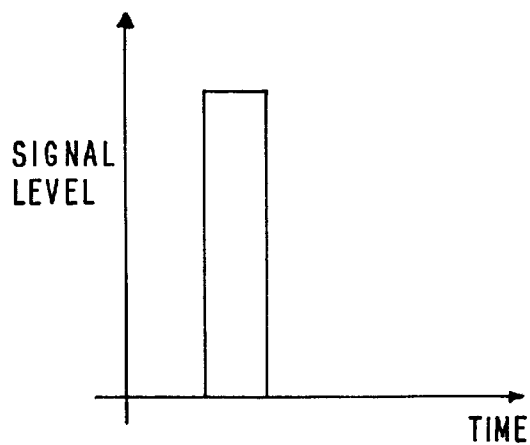
FIGS. 9A and 9B are graphs and illustrate the output signals from a sensor over time in response to the same level of incident light as emitted by R, G, and B CRTs.
Figure 9B:
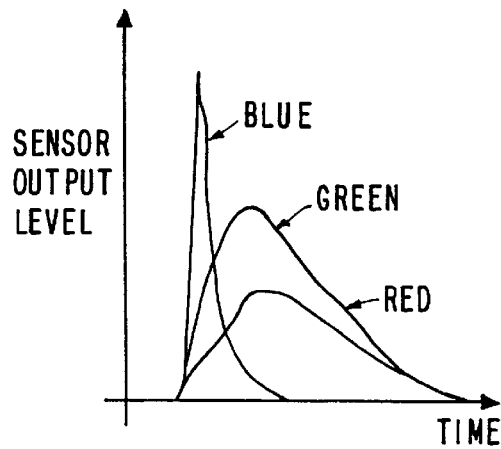
Figure 10:
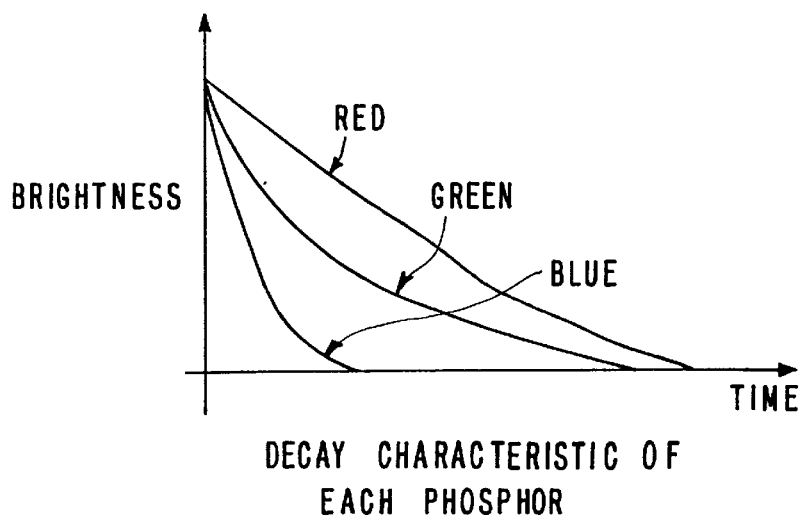
FIG. 10 is a graph of decay characteristics of phosphors responsive to primary R, G, B colors.
Figure 11:
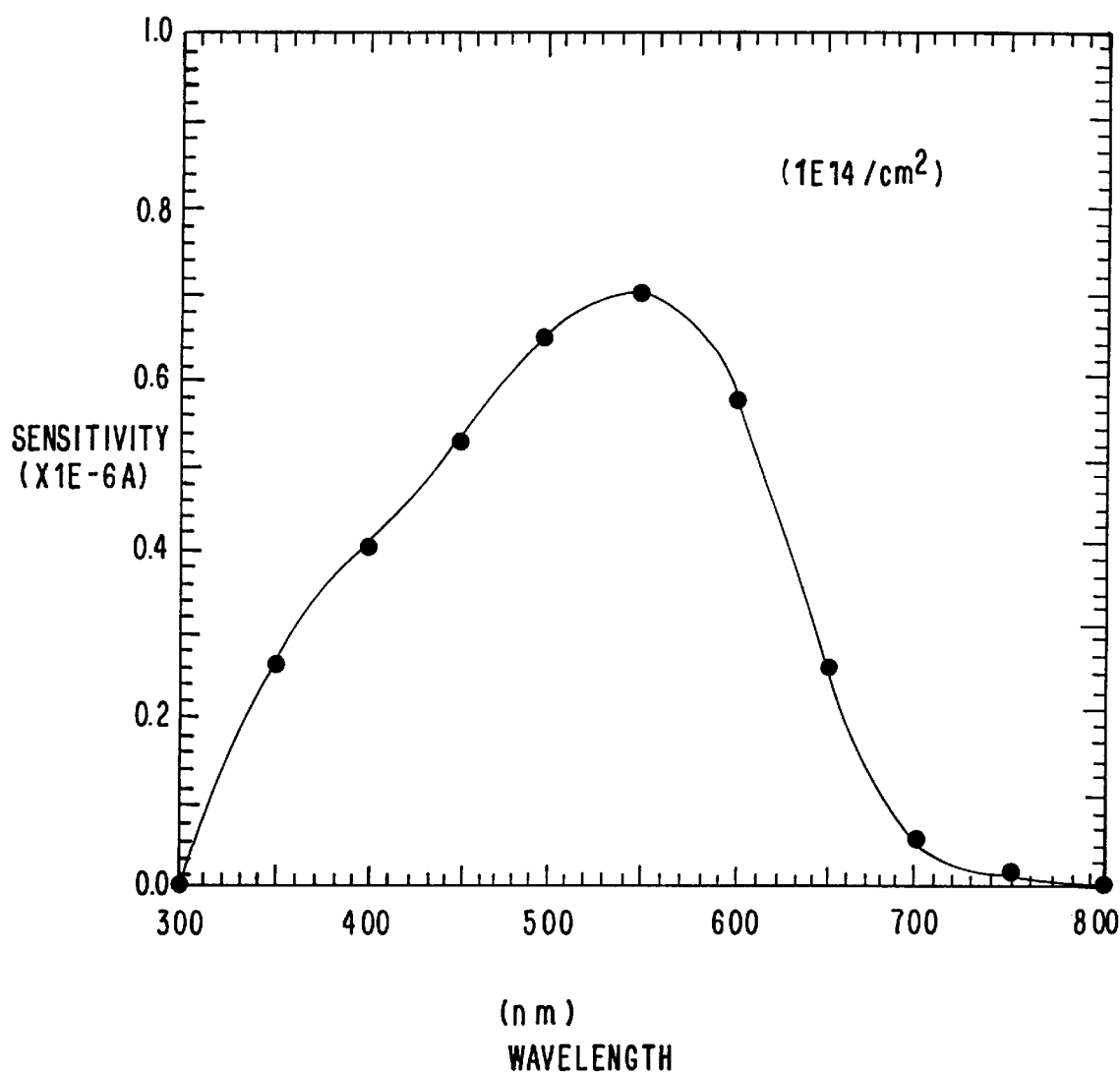
FIG. 11 is a graph of sensor sensitivity with respect to light beam wavelength as received by a sensor.

It has been recognized that output signal levels of red, green and blue sensors, such as the convergence photosensors 64, 66, 68 and 70, vary even if an input intensity level is constant or substantially the same. As shown in FIG. 9A, when the input intensity to a photosensor is maintained at substantially the same level for each of the red, green and blue light beams (such as generated by the CRTs 82, 84 and 86), the output level of the sensor (such as the photosensors 64, 66, 68 and 70) varies based on the color, as shown in FIG. 9B. Namely, FIG. 9B shows that the highest peak output signal is produced in response to a blue light beam, and that the lowest peak output signal is produced in response to a red light beam. This difference in output signal level is due to variations in decay characteristics of each phosphor corresponding to the R, G, B primary colors, as shown in FIG. 10. Further, FIG. 11 illustrates a typical relationship between the sensitivity of a photosensor and light of various wavelengths to which the photosensor responds, thereby indicating another reason for the variations in the output signal levels of the sensors.

To compensate for the variations in output signal levels of the sensors as indicated hereinabove, a low-pass filter may be inserted before the analog-to-digital converter. Such a filter has a cutoff frequency and transmits signals with frequencies below the cutoff frequency but attenuates signals with frequencies above the cutoff frequency. FIG. 8 depicts such an arrangement, in which the low-pass filter circuit 73 is inserted in front of the A/D converter 74.

The low-pass filter circuit 73 is advantageously controlled by the controller 76 to switch between various filter characteristics, e.g., to change the cutoff frequency. The low-pass filter circuit 73 preferably alters the filter characteristics depending upon the type of light beam incident on the photosensor. That is, the low-pass filter circuit preferably has one set of filter characteristics when blue light is sensed, another set of filter characteristics when green light is sensed, and yet another set of filter characteristics when red light is sensed.

FIGS. 12A–12E aid in understanding why a low-pass filter circuit with selectable characteristics is desirable. FIG. 12A shows the screen 60 and the right and left photosensors 64 and 68 from FIG. 8. For clarity of illustration, the top and bottom photosensors 70 and 66 are not depicted. FIG. 12A also shows a measurement pattern 120 in the vicinity of the photosensors 64 and 68 along with a picture or non-measurement pattern 122 on the screen. The measurement pattern may be formed by a beam of monochromatic light from any one of the CRTs 82, 84, 86, as discussed above. The picture or non-measurement pattern may be any color.

FIG. 12B illustrates an example of signal levels for a red measurement pattern, denoted by reference numeral 124, and a red non-measurement pattern, denoted by reference numeral 126. Similarly, FIG. 12C illustrates an example of signal levels for a blue measurement pattern, denoted by reference numeral 128, and a blue non-measurement pattern, denoted by reference numeral 130. The signal levels for green patterns would be intermediate between those for red and blue, as indicated by FIG. 9B and FIG. 10.

FIG. 12D shows the sensor output level as a function of time in response to the red signal of FIG. 12B. The dashed line $V_{red}$ and reference numeral 132 in FIG. 12D designate the peak sensor output level. FIG. 12E shows the sensor output level as a function of time in response to the blue signal of FIG. 12C. The dashed line $V_{blue}$ and reference numeral 134 in FIG. 12E designate the peak sensor output level. Together, FIGS. 12D and 12E indicate that the peak output level $V_{red}$ is approximately the same as the peak output level $V_{blue}$, even though the blue input intensity is less than the red input intensity. FIGS. 12D and 12E also indicate that the output signal resulting from the blue input intensity decays more rapidly than the output signal resulting from the red input intensity.

If a picture or non-measurement pattern is displayed during adjustment, the brightness level of that pattern may be affected depending on the color used for the measurement pattern.

FIG. 10 illustrates the brightness level of a signal produced in response to a blue light beam decaying more rapidly than the brightness level of a signal produced in response to a green light beam. FIG. 10 also illustrates the brightness level of a signal produced in response to a green light beam decaying more rapidly than the brightness level of a signal produced in response to a red light beam. Hence, FIG. 10 indicates that the frequency content of the sensor output signal depends upon the type of incident light beam.

Inasmuch as the frequency content of the sensor output signal varies with the type of incident light beam, a low-pass filter circuit with switchable or selectable filter characteristics is desirable. Such a low-pass filter circuit may have one set of filter characteristics that are chosen based on the frequency content of sensor output signals produced by a blue light beam, another set of filter characteristics that are chosen based on the frequency content of sensor output signals produced by a green light beam, and yet another set of filter characteristics that are chosen based on the frequency content of sensor output signals produced by a red light beam.

Figure 13:
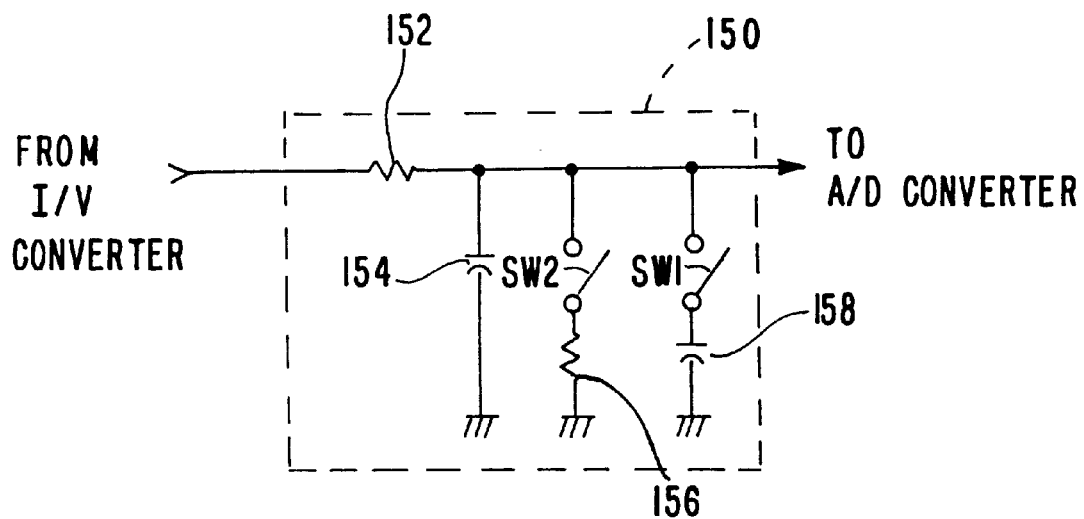
FIG. 13 is a schematic diagram of a low-pass filter circuit for use in an apparatus according to the invention.
Figure 14:
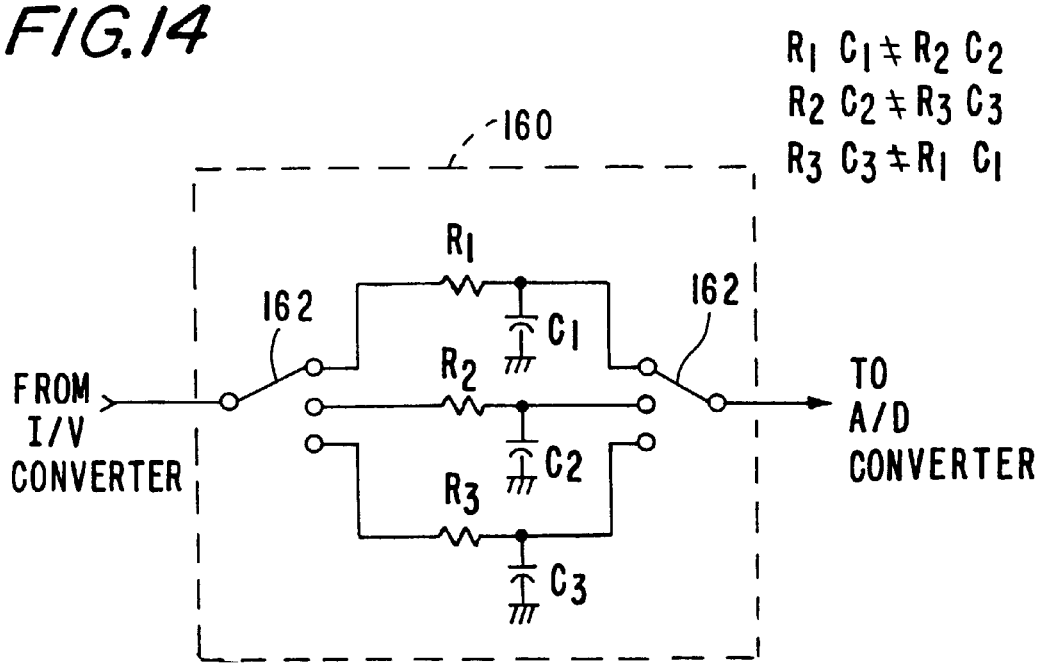
FIG. 14 is a schematic diagram of another low-pass filter circuit for use in an apparatus according to the invention.

FIGS. 13 and 14 are schematic diagrams of low-pass filter circuits having selectable filter characteristics. Referring first to FIG. 13, a low-pass filter circuit 150 includes a resistor 152 and a capacitor 154. The resistor 152 and the capacitor 154 form a resistance-capacitance low-pass filter. The low-pass filter circuit 150 also includes a resistor 156 that is connected to or disconnected from the other components by a switch SW2. The low-pass filter circuit 150 additionally includes a capacitor 158 that is connected to or disconnected from the other components by a switch SW1. The switches SW1 and SW2 may be actuated by a controller, such as the controller 76 discussed above.

As those having ordinary skill in the art will appreciate, the filter characteristics of the circuit 150 are changed by opening and closing the switches SW1 and SW2. FIGS. 15A and 15B illustrate an example of how the filter characteristics may be altered to affect the signals supplied to the A/D converter. FIG. 15A depicts signals resulting from a blue light beam (on the left), signals resulting from a green light beam (in the center), and signals resulting from a red light beam (on the right). As specified in FIG. 15A, the switches SW1 and SW2 in the low-pass filter circuit 150 are open for each of the signals. Consequently, the filter characteristics are the same for each of the signals, and the filter characteristics are determined by the resistor 152 and the capacitor 154.

FIG. 15A indicates that the signals resulting from the blue light beam have a higher peak level and decay more rapidly than the signals resulting from the green light beam. FIG. 15A also indicates that the signals resulting from the green light beam have a higher peak level and decay more rapidly than the signals resulting from the red light beam.

FIG. 15B, like FIG. 15A, shows signals from the low-pass filter circuit 150 that are supplied to the A/D converter. FIG. 15B, like FIG. 15A, depicts signals resulting from the blue light beam (on the left), signals resulting from the green light beam (in the center), and signals resulting from the red light beam (on the right). In contrast to FIG. 15A, however, FIG. 15B shows that the switches SW1 and SW2 in the low-pass filter circuit 150 are selectably closed, depending upon the type of light beam incident on the sensor.

More specifically, when a blue light beam is incident on the sensor, the switch SW1 is closed and the switch SW2 is open. In this state, the low-pass filter consists of the resistor 152, the capacitor 154, and the capacitor 158, and these three components determine the filter characteristics. When a green light beam is incident on the sensor, the switch SW1 is open and the switch SW2 is closed. In this state, the low-pass filter consists of the resistor 152, the capacitor 154, and the resistor 156, and these three components determine the filter characteristics. When a red light beam is incident on the sensor, the switches SW1 and SW2 are both open. In this state, the low-pass filter consists of the resistor 152 and the capacitor 154, as in FIG. 15A, and these two components determine the filter characteristics.

As can be seen by comparing FIG. 15A and FIG. 15B, the use of a low-pass filter circuit with selectable filter characteristics permits the peak level for signals resulting from the blue and green light beams to be reduced so they approximate the peak level for signals resulting from the red light beam. The reduction in the peak level for signals resulting from the blue and green light beams allows for a decrease in the dynamic range of the A/D converter, with the advantages described above. In addition, the use of a low-pass filter circuit with selectable filter characteristics provides good measurement resolution without adversely affecting other parts of the screen, as those having ordinary skill in the art will appreciate.

FIG. 14 illustrates another example of a low-pass filter circuit with selectable filter characteristics. The low-pass filter circuit 160 includes a first resistance-capacitance low-pass filter formed by a resistor $R_1$ and a capacitor $C_1$, a second resistance-capacitance low-pass filter formed by a resistor $R_2$ and a capacitor $C_2$, a third resistance-capacitance low-pass filter formed by a resistor $R_3$ and a capacitor $C_3$, and a switch 162. The position of the switch 162 is changed to select between the first low-pass filter, the second low-pass filter, and the third low-pass filter. The switch 162 may be actuated by a controller, such as the controller 76 discussed above.

The characteristics of the three low-pass filters formed by $R_1$-$C_1$, $R_2$-$C_2$, and $R_3$-$C_3$ in the low-pass filter circuit 160 are preferably different from one another, as indicated by the relationships $(R_1)(C_1) \neq (R_2)(C_2)$, $(R_2)(C_2) \neq (R_3)(C_3)$, and $(R_3)(C_3) \neq (R_1)(C_1)$. The switch 162 preferably operates to insert one of the three low-pass filters into the system between a current-to-voltage converter and an analog-to-digital converter depending upon the type of light beam incident on the photosensor. For instance, the first low-pass filter formed by $R_1$-$C_1$ may be inserted into the system when a blue light beam is incident on the sensor, the second low-pass filter formed by $R_2$-$C_2$ may be inserted into the system when a green light beam is incident on the sensor, and the third low-pass filter formed by $R_3$-$C_3$ may be inserted into the system when a red light beam is incident on the sensor. The characteristics of each low-pass filter may then be tailored to the associated signals, with the advantages discussed above, e.g., reduction in the dynamic range of the A/D converter.

The invention has been shown and described in conjunction with preferred or exemplary embodiments and features thereof. The matter shown and described should be interpreted as illustrative, and not in a limiting sense. Those having ordinary skill in the art will recognize that various changes and modifications may be made in form, construction, and arrangement without departing from the spirit and scope of the invention, which is defined by the appended claims. For example, one of the switches SW1 and SW2 shown in FIG. 13 may be eliminated along with the associated component, depending on accuracy and cost requirements. Furthermore, the low-pass filter circuits of FIG. 13 and FIG. 14 are just two examples of suitable circuits with selectable filter characteristics. Other low-pass filter circuits with selectable characteristics may be employed. Therefore, it is intended that the appended claims be interpreted as encompassing the embodiments disclosed herein, changes and modifications thereof, as well as equivalents thereto.

What is claimed is:

1. Apparatus for performing convergence calibration in a system using multiple light beams to generate a video display on a screen, comprising:

means for generating a first beam of light at a first wavelength;

means for generating a second beam of light at a second wavelength, the second wavelength being different than the first wavelength;

means for sensing said first and second light beams and producing output signals in response to said first and second light beams;

means for filtering the output signals from the sensing means, said filtering means having first filter characteristics and second filter characteristics, said first filter characteristics being chosen based on the frequency content of the output of said sensing means produced in response to said first light beam, and said second filter characteristics being chosen based on the frequency content of the output of said sensing means produced in response to said second light beam; and means for controlling said filter means to switch between said first filter characteristics and said second filter characteristics.

2. The apparatus according to claim 1, wherein said filter means is controlled to have said first filter characteristics when said first light beam is sensed by said sensing means and to have said second filter characteristics when said second light beam is sensed by said sensing means.

3. The apparatus according to claim 1, wherein the first filter characteristics are such that the filter means has a first cutoff frequency and transmits signals with frequencies below the first cutoff frequency but attenuates signals with frequencies above the first cutoff frequency, wherein the second filter characteristics are such that the filter means has a second cutoff frequency and transmits signals with frequencies below the second cutoff frequency but attenuates signals with frequencies above the second cutoff frequency, and wherein the first cutoff frequency and the second cutoff frequency are different.

4. The apparatus according to claim 1, wherein said filter means includes a low-pass filter with at least one resistor, at least two capacitors, and a switch for disconnecting one of the capacitors.

5. The apparatus according to claim 1, wherein said filter means includes a low-pass filter with at least one capacitor, at least two resistors, and a switch for disconnecting one of the resistors.

6. The apparatus according to claim 1, wherein said filter means includes a first low-pass filter, a second low-pass filter, and a switch capable of connecting either the first low-pass filter or the second low-pass filter to the signals from the sensing means.

7. A method for performing convergence calibration in a system using multiple beams to generate a video display on a screen, said method comprising the steps of:

generating a first beam at a first wavelength;

generating a second beam at a second wavelength, the second wavelength being different than the first wavelength;

sensing the first beam via a sensing means;

producing a first output signal in response to the first beam;

sensing the second beam via said sensing means;

producing a second output signal in response to the second beam;

filtering the first and second output signals with a filter circuit having first filter characteristics and second filter characteristics, said first filter characteristics being chosen based on the frequency content of the output of said sensing means produced in response to said first beam, and said second filter characteristics being chosen based on the frequency content of the output of said sensing means produced in response to said second beam; and controlling the filter circuit to switch between the first filter characteristics and the second filter characteristics.

8. The method of claim 7, wherein the step of controlling includes controlling the filter circuit to have said first filter characteristics when said first beam is being sensed and to have said second filter characteristics when said second beam is being sensed.

9. The method of claim 7, wherein the first filter characteristics are such that the filter circuit has a first cutoff frequency and transmits signals with frequencies below the first cutoff frequency but attenuates signals with frequencies above the first cutoff frequency, wherein the second filter characteristics are such that the filter circuit has a second cutoff frequency and transmits signals with frequencies below the second cutoff frequency but attenuates signals with frequencies above the second cutoff frequency, and wherein the first cutoff frequency and the second cutoff frequency are different.

10. The method of claim 7, wherein the filter circuit includes a plurality of resistors and a plurality of capacitors, and wherein the step of controlling includes disconnecting one of the capacitors from the other components of the filter circuit.

11. The method of claim 7, wherein the filter circuit includes a plurality of resistors and a plurality of capacitors, and wherein the step of controlling includes disconnecting one of the resistors from the other components of the filter circuit.

12. The method of claim 7, wherein the filter circuit includes a first low-pass filter and a second low-pass filter, and wherein the step of controlling includes switching between the first low-pass filter and the second low-pass filter.

13. Apparatus for performing convergence calibration in a system using multiple beams to generate a video display on a screen, comprising:

a first cathode ray tube that produces a first beam with a first color;

a second cathode ray tube that produces a second beam with a second color;

a video processor connected to the first and second cathode ray tubes;

a sensor that produces first and second output signals in response to the first and second beams, respectively;

a low-pass filter having first filter characteristics associated with the first beam and second filter characteristics associated with the second beam, said low-pass filter being connected to receive signals derived from the first and second output signals of the sensor, wherein said first filter characteristics are chosen based on the frequency content of the output of said sensor produced in response to said first beam, and said second filter characteristics are chosen based on the frequency content of the output of said sensor produced in response to said second beam; and a controller that supplies control signals to the video processor and to the low-pass filter, said controller being connected to receive signals derived from the output of the low-pass filter.

14. The apparatus according to claim 13, further comprising a current-to-voltage converter and an analog-to-digital converter, wherein the current-to-voltage converter receives input signals from the sensor and supplies output signals to the low-pass filter, and wherein the analog-to-digital converter receives input signals from the low-pass filter and supplies output signals to the controller.

15. The apparatus according to claim 13, wherein the low-pass filter includes at least one resistor, at least two capacitors, and a switch for disconnecting one of the capacitors.

16. The apparatus according to claim 13, wherein the low-pass filter includes at least one capacitor, at least two resistors, and a switch for disconnecting one of the resistors.

17. The apparatus according to claim 13, wherein the low-pass filter includes a first resistance-capacitance low-pass filter, a second resistance-capacitance low-pass filter, and a switch capable of connecting either the first resistance-capacitance filter or the second resistance-capacitance filter to the signals derived from the photosensor.

* * * * *